United States Patent
Taylor et al.

(10) Patent No.: US 12,517,829 B1
(45) Date of Patent: Jan. 6, 2026

(54) PROCESSING WRITES TO MULTIPLE TARGETS IN A DIRECTORY-BASED CACHE COHERENT ELECTRONIC SYSTEM

(71) Applicant: ARTERIS, INC., Campbell, CA (US)

(72) Inventors: Eric Taylor, Austin, TX (US); Laurent Moll, San Jose, CA (US); Hao Luan, Plano, TX (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 18/901,028

(22) Filed: Sep. 30, 2024

(51) Int. Cl.
 *G06F 12/0815* (2016.01)
 *G06F 12/0817* (2016.01)
 *G06F 12/0844* (2016.01)

(52) U.S. Cl.
 CPC ...... *G06F 12/0815* (2013.01); *G06F 12/0824* (2013.01); *G06F 12/0844* (2013.01)

(58) Field of Classification Search
 None
 See application file for complete search history.

(56) References Cited

U.S. PATENT DOCUMENTS

| | | | | |
|---|---|---|---|---|
| 2003/0041215 A1* | 2/2003 | George | ............. | G06F 12/0813 711/E12.027 |
| 2010/0262787 A1* | 10/2010 | Arimilli | ............. | G06F 12/123 711/146 |
| 2011/0320695 A1* | 12/2011 | Berger | ............. | G06F 12/0855 711/E12.001 |
| 2014/0052916 A1* | 2/2014 | Lih | ............. | G06F 12/0806 711/119 |
| 2015/0331794 A1* | 11/2015 | Ren | ............. | G06F 3/064 709/214 |
| 2019/0018775 A1* | 1/2019 | Ambroladze | ........ | G06F 12/0831 |
| 2019/0146916 A1* | 5/2019 | Matsakis | ............. | G06F 12/084 711/130 |
| 2019/0370174 A1* | 12/2019 | Eckert | ............. | G06F 12/0824 |

* cited by examiner

*Primary Examiner* — Kaushikkumar M Patel
(74) *Attorney, Agent, or Firm* — Jubin Dana; Dana Legal Services

(57) ABSTRACT

In a multi-core electronic system, a directory-based method of processing a request transaction includes, upon receipt of the request transaction, communicating with a plurality of directories to acquire ownership of cache lines to establish a single point of serialization. Write data is thereafter streamed to owned cache lines in at least two targets in parallel while keeping ordered write observation. The writes to the at least two targets are processed out of order but observed in order.

20 Claims, 6 Drawing Sheets

PROCESSING WRITES TO MULTIPLE TARGETS IN A DIRECTORY-BASED CACHE COHERENT ELECTRONIC SYSTEM

TECHNICAL FIELD

The present technology is in the field of multi-core electronic systems.

BACKGROUND

A multi-core electronic system may include multiple processors or cores having local caches that communicate with shared memory. Data is transferred to and from the shared memory in blocks of fixed size, called "cache lines" or "cache blocks."

Cache coherence is a protocol that maintains consistency of data stored in shared memory. When multiple cores are accessing and modifying the same memory locations in shared memory, cache coherence ensures that any changes made by one core are immediately visible to all other cores, thereby preventing data inconsistencies.

A directory-based protocol is commonly used to ensure cache coherency. A directory acts as a single serializing point through which permission is requested to store data in shared memory.

The directory can be distributed to improve scalability. Multiple directories may be used instead of a single directory. Each directory ensures cache coherence with respect to a range or slice of memory addresses.

An issue arises when ordered writes are sent to different targets: the writes can be completed out of order. One way to guarantee order is to wait for the writes to one target to fully finish and then send writes to the next target.

Another issue arises because each directory ensures order only to its own slice of memory. With ordered write observation, however, the order of the writes must be preserved regardless of the target address.

SUMMARY

In accordance with various embodiments and aspects herein, a directory-based method of processing a request transaction in a multi-core electronic system includes, upon receipt of the request transaction, communicating with a plurality of directories to acquire ownership of cache lines for writes in the request transaction to establish a single point of serialization. Write data is thereafter streamed via owned cache lines to at least two of the multiple targets in parallel while also keeping ordered write observation. The writes to the at least two of the multiple targets may be processed out of order, but they are observed in order.

In accordance with various embodiments and aspects herein, a multi-core electronic system includes a plurality of initiators, and an interconnect. The interconnect includes a corresponding plurality of initiator interfaces for the initiators, and multiple directories for maintaining cache coherence. The system further includes a plurality of targets for communicating with the plurality of initiators via the interconnect. Each initiator interface is configured to receive request transactions from its corresponding initiator; and communicate with at least one of the directories to acquire ownership of cache lines upon receipt of a request transaction having writes to multiple targets. Each initiator interface is further configured to observe order of the cache lines, stream write data to owned cache lines in at least two of the multiple targets in parallel, and terminate ownership of the cache lines as ordered.

In accordance with various embodiments and aspects herein, a network-on-chip (NoC) for a multi-core electronic system includes a transport interconnect, a plurality of initiator network interface units (NIUs) and target NIUs for communicating over the transport interconnect via a packet-based protocol; and multiple directories for maintaining cache coherence. Each initiator NIU is configured to receive request transactions; buffer write data; communicate with at least one of the directories over the transport interconnect to acquire ownership of cache lines upon receipt of a request transaction having writes to multiple endpoints, observe order of the cache lines, stream buffered write data to owned cache lines via at least two of the target NIUs, and terminate ownership of the cache lines as ordered.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

The terms "source," "master," and "initiator" are used interchangeably herein. The terms "sink," "slave," and "target" are used interchangeably herein.

A "transaction" may refer to a request transaction or a response transaction. A transaction may contain one or more destination addresses for one or more components the transaction is sent to. The address may include the address of a sub-component (e.g., an individual register within an array of registers, internal memory, etc.).

Figure 1:
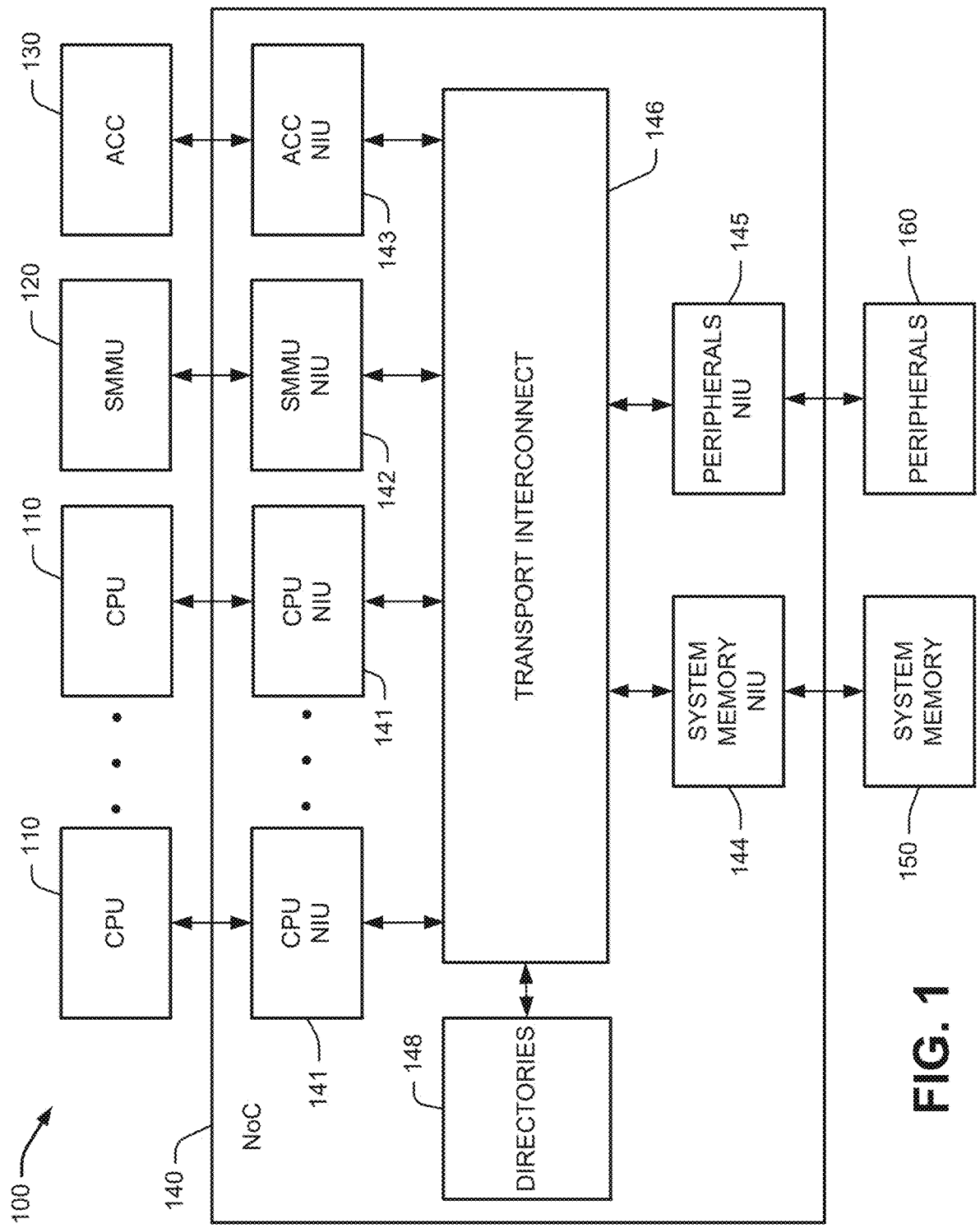
FIG. 1 shows a multi-core electronic system including a network-on-chip in accordance with various aspects and embodiments herein.

Reference is made to FIG. 1, which illustrates an electronic system 100 including a plurality of cores. The cores include initiators such as central processing units (CPUs) 110, a system management memory unit (SMMU) 120, and an accelerator 130. The CPUs 110 have caches. The SMMU 120 typically has a cache and a translation lookaside buffer (TLB). The accelerator 130 may or may not have a cache.

The cores also include targets such as system memory 150 and peripheral devices 160. The targets do not communicate with each other.

The electronic system 100 further includes a network-on-chip (NoC) 140. The NoC 140 sends request transactions from an initiator to one or more targets using industry-standard protocols. A request transaction includes an address of the target. The NoC 140 decodes the address and transports the request transaction. The target handles the request transaction and sends a response transaction, which is transported back to the initiator via the NoC 140.

The NoC 140 includes a plurality of network interface units (NIUs) 141-145 and a transport interconnect 146. Each initiator is coupled to the transport interconnect 146 via a corresponding NIU. Thus, each CPU 110 is coupled to the transport interconnect 146 via a CPU NIU 141, the SMMU 120 is coupled to the transport interconnect 146 via an SMMU NIU 142, and the accelerator 130 is coupled to the transport interconnect 146 via an accelerator NIU 143.

Each target is coupled to the transport interconnect 146 via a corresponding NIU. Thus, the system memory 150 is coupled to the transport interconnect 146 via a system memory NIU unit 144, and the peripheral devices 160 are coupled to the transport interconnect 146 via a peripherals NIU 145.

Each NIU 141-145 is configured to convert the protocol used by its corresponding core into a transport protocol used inside the NoC 140. The transport protocol is typically based on the transmission of packets. Each NIU 141-145 includes a transaction table that holds information about every incoming transaction. Each transaction follows a state machine depending on transaction properties. When a transaction has been completed (typically when the target responds upstream), the transaction is removed from the transaction table. Each NIU 141-145 also may include memory for holding data for each transaction in the transaction table. An additional function of the NIUs 141-145 will be discussed below.

The transport interconnect 146 transports packets between the NIUs 141-145. The transport interconnect 146 includes switches, adapters, and buffers. Switches may be used to route flows of traffic between source and destinations. Adapters may be used to deal with various conversions between data width, clock and power domains. Buffers may be used to insert pipelining elements to span long distances, or to store packets to deal with rate adaptation between fast senders and slow receivers or vice-versa.

The NoC 140 is cache-coherent, that is, the NoC 140 ensures cache coherence across the electronics system 100 by maintaining consistency of shared data stored in local caches of the CPUs 110, data stored in the system memory 150, and data stored in other shared memory. When multiple cores are accessing and modifying the same memory locations, the coherent NoC 140 ensures that any changes made by one core are immediately visible to all other cores, thereby preventing data inconsistencies.

The NoC 140 implements a cache-coherent protocol. One example of such a protocol is MOESI (Modified, Owned, Exclusive, Shared, Invalid).

The NoC 140 includes multiple directories 148. Each directory 148 may include a dedicated processor (e.g., memory and a state machine) that facilitates the communication between different cores and ensures cache coherence with respect to a range or slice of memory addresses. Each directory 148 may have a directory transactions table for keeping track of the status of the cache lines for which it is responsible. Entries in the table indicate the status of the cache lines (e.g., invalid, owned). In some embodiments, each directory 148 also keeps track of the state of a certain number of cache lines (including a cache coherence state of each cache line), which cores are sharing a given cache line at a given time, and which cores have data when in a shared state. The directories 148 do not communicate with each other.

For other cache lines, the directory doesn't keep track of any states and instead snoops out all of the cores to determine the states of the other cache lines. In other embodiments, the directory doesn't store any states and instead orchestrates the communication to the cores to determine the states of the cache lines.

As used herein, a cache line refers to a data block of fixed size. The block can reside in cacheable or non-cacheable region. Thus, a cache line is not limited to a data block inside a cacheable region. In FIG. 1, for example, cache lines are inside the system memory 150.

Figure 2:
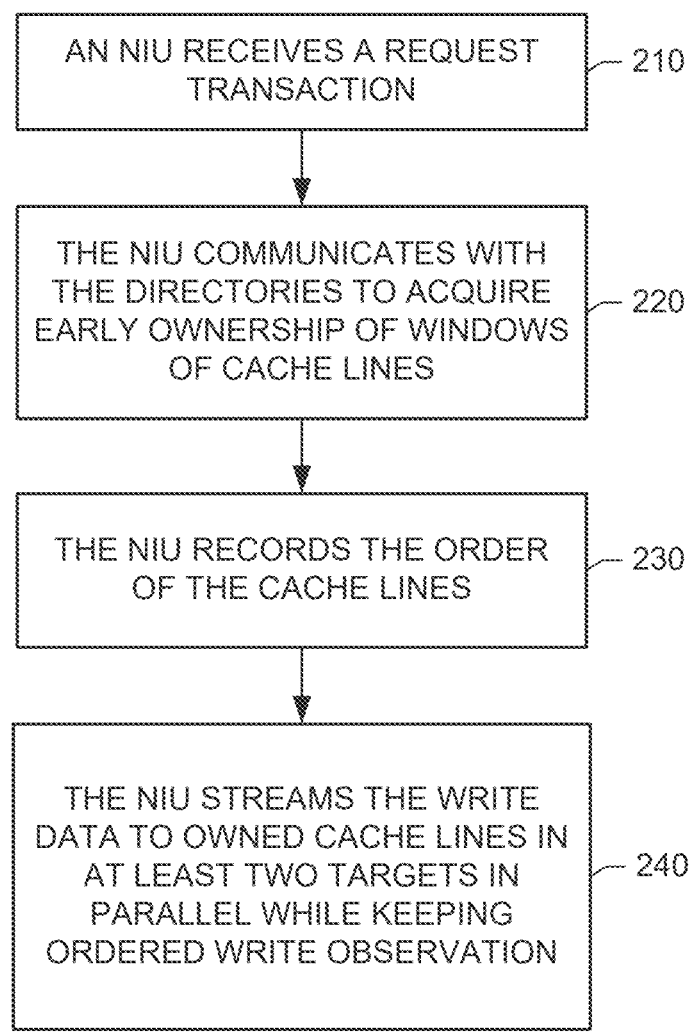
FIG. 2 shows a directory-based method for writing data to multiple targets in accordance with various aspects and embodiments herein.

Reference is made to FIG. 2, which illustrates a method of processing a request transaction that includes writes to multiple targets. Each write in the request transaction identifies a target address.

At block 210, an NIU receives the request transaction from its corresponding initiator. The writes and corresponding write data are buffered in the NIU. The request transaction may have strongly ordered requirements. If the incoming writes need to be strongly ordered, then the writes are committed in the order they are received.

At block 220, the NIU communicates with the directories to acquire early ownership of windows of cache lines in the targets. For each write, the NIU selects a directory according to the write's target address, and it infers a cache line in the selected directory from the target address. The NIU may send a cache maintenance operation (CMO) to the selected directory to acquire ownership of the cache line inferred from the target address. This may be done for each write in the request transaction, and it can be done out of order.

Once ownership of a cache line is granted to the NIU, other NIUs cannot acquire ownership of that cache line and are blocked from using or otherwise observing that cache line until ownership is terminated or revoked.

In some instances, data is transferred from the initiator to an internal buffer in the NIU while the NIU is acquiring ownership of the cache lines. In other instances, the NIU might wait for the data to be stored inside its internal buffer before it starts acquiring ownership of the cache lines. As discussed below, there are advantages to acquiring such early ownership.

At block 230, the NIU records the order of the cache lines. The NIU's transaction table keeps a linked list maintaining the order the writes are received. In some embodiments, the NIU may use a different data structure, such as a first-in, first-out buffer.

At block 240, the NIU streams the write data to owned cache lines in at least two of the multiple targets in parallel while also keeping ordered write observation. Multiple directories may be granting ownership of cache lines in parallel. As a result, writes to different targets may be interleaved. This, in turn, enables write data to be streamed to multiple targets in parallel.

However, the writes might not be executed in order. Consider the example in which a first write to a first target is committed and sent, and then a second write to a second target is committed and sent. The second write is executed before the first write. That is, the first and second writes are processed out of order Keeping the ordered-write observation includes observing the cache lines in order and terminating ownership of the cache lines in order. A write becomes observable after ownership of its cache line is terminated. Thus, in the example above, even though the second write is executed before the first write, its write data does not become observable until after the first write becomes observable. Therefore, the first and second writes are processed out of order but observed in order.

After ownership of all cache lines are terminated, a string of writes is observable inside the multiple targets so that a read after this point of observability will see the writes in the same order they are issued in the request transaction.

By getting quick ownership of a window of cache lines, the method of FIG. 2 creates a single ordering point with the NIU. Because the NIU is the point of serialization, it can send out writes in any order to any number of targets. And because the ownership doesn't have to be assigned in order, and the writes do not have to be executed in order, the method of FIG. 2 is faster and more efficient than waiting for a stream of writes associated with one target to be finished, and then switching to another target and waiting for another stream of writes to be finished, and so on.

Figure 3:
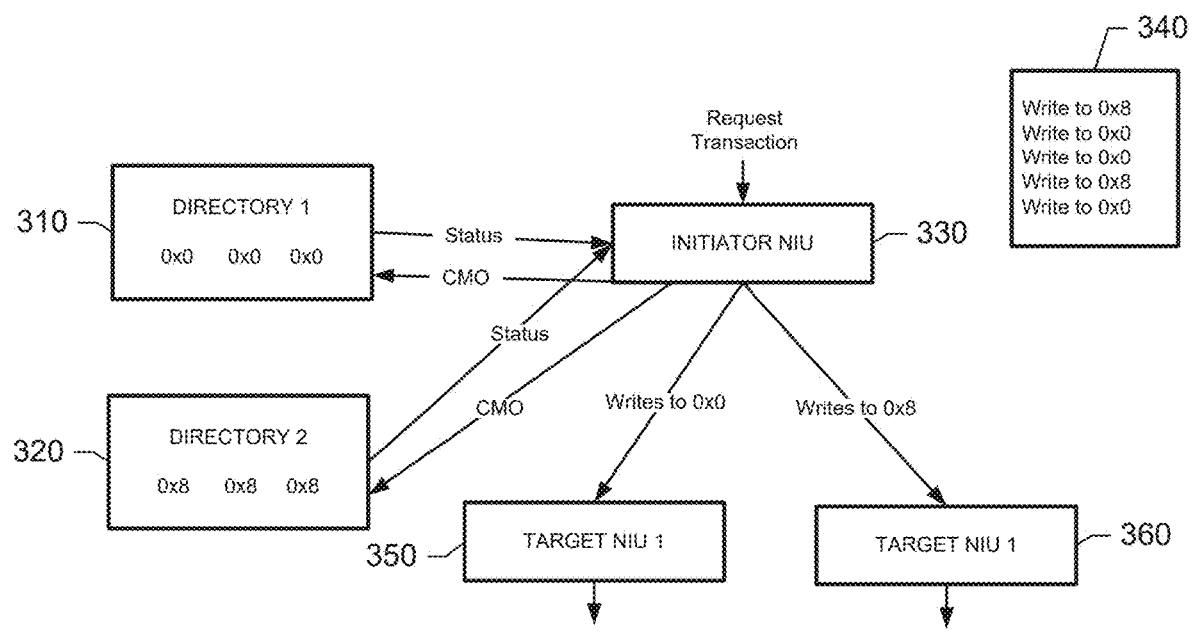
FIG. 3 shows an example of communications to and from an initiator network interface unit during streaming of writes to first and second targets in accordance with various aspects and embodiments herein.

Reference is made to FIG. 3, which illustrates an example of communications to and from an initiator NIU 330 during streaming of writes to first and second targets (the targets are not shown). In the example of FIG. 3, a first directory 310 is responsible for a first range of addresses (addresses 0x0 . . . 0) of shared memory of the first target, and a second directory 320 is responsible for a second range of addresses (addresses 0x8 . . . 0) of shared memory of the second target. FIG. 3 also shows three entries for cache lines in each directory 310 and 320.

The initiator NIU 330 receives the request transaction, and sends CMOs to the first and second directories 310 and 320 to get early ownership of the cache lines corresponding to the writes. The initiator NIU 330 also creates a linked list 340 that maintains the order of the writes. Once a directory 310 or 320 grants ownership to a cache line, it informs the NIU 330 of the status (in this case, "owned") of the cache line.

Once ownership is granted to the cache line corresponding to the oldest write, that write is committed and sent to its target. Assuming ownership is granted to all of the cache lines in the directories, then according to the linked list 340, a write is sent to the first target, then a write to the second target, then two writes to the first target, followed by a write to the second target. Thus, writes to the first and second targets (via first and second target NIUs 350 and 360 are streamed in parallel.

Figure 4:
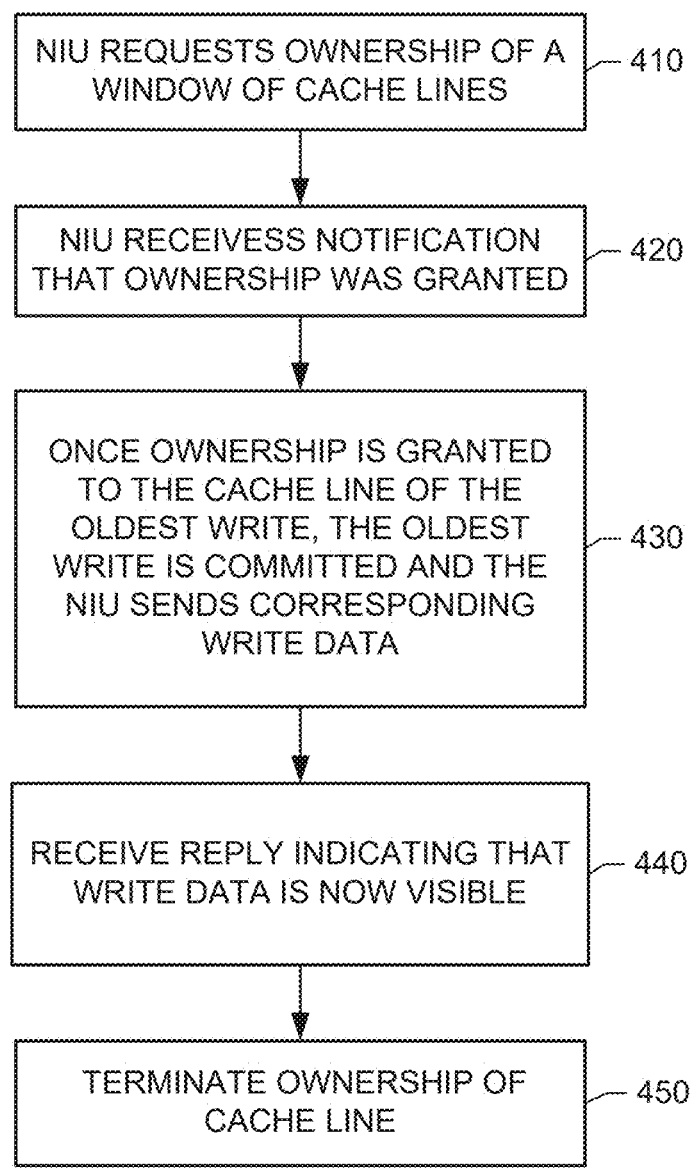
FIG. 4 shows a more detailed method performed by a network interface unit after a request transaction has been received in accordance with various aspects and embodiments herein.

Reference is now made to FIG. 4, which illustrates a more detailed method performed by an NIU after a request transaction has been received. At block 410, the NIU unit sends CMOs or other requests to the directories to request ownership of a window of cache lines.

At block 420, each directory determines whether ownership can be granted to each of the cache lines in the window. The ownership will not necessarily be granted in the same order as the writes. For ownership to be granted, a series of events occur. First, the CMO is entered in the directory transaction table. This event occurs if the transaction table doesn't have an outstanding transactions to that cache line. Once the CMO has been entered, the directory sends snoops to all of the appropriate NIUs. The directory waits to receive responses before the CMO can make progress. Once the responses are received, and no transactions are outstanding, the directory grants the state that was requested (in this case, owned). The directory notifies the NIU when ownership has been granted.

At block 430, once ownership is granted to the cache line of the oldest write, the oldest write is committed. A write becomes oldest once all of the earlier writes have been sent downstream. After a write is committed, the NIU sends the corresponding write data to the owned cache lines in a target.

The write may be a non-coherent write such as a write-back. The write-back carries data. In a write-back policy, data is written only to the cache, and data in the cache is written back to memory at a later time (when a cache line is evicted). Since the NIU doesn't have a cache, its flow is analogous to a write-back policy.

At block 440, after the write has executed, a reply is sent from the target to the NIU. For example, the NIU receives a DTWRsp (Write is observable), which is a control instruction that informs the NIU that the write is completed and the write data is now visible. Since the NIU still has ownership of the cache line, still no other NIUs can observe the write data.

At block 450, ownership of the cache line is terminated. The NIU may send an update request (another CMO) to the directory to terminate ownership. Once the ownership is terminated, that write data becomes observable to all NIUs.

Blocks 410-450 are performed for each directory. As a result, writes can be streamed to multiple targets in the same order as the request transaction. The writes may or may not be executed in order. However, the writes are observed in order. In this manner, the ordered-write observation is kept.

Moreover, the method of FIG. 4 decouples ownership acquisition from the writes. Cache coherence can be achieved with ownership and non-coherent write commands (e.g., CMOs and write-backs) that are lightweight in that they requires less messaging than a full Coherent Write. The CMO is dataless, and the write-backs don't communicate with the directories. This enables the NIU to get quicker control over a cache line so it can control ordering. The quicker the NIU can control ordering, the faster it can stream data downstream to the targets.

An NIU configured to perform the method of FIG. 2 is not limited to coherent writes in the request transaction, nor is it limited to the streaming of write data to multiple targets. The NIU can also be configured to communicate with a single directory and send writes and corresponding write data to a single target.

The NIU may be configured to process a request transaction having a mix of writes for coherent and non-coherent regions. What region they go to is what determines the flow needed to perform the write. For non-coherent writes in the request transaction, the NIU sends the non-coherent writes in a manner in which they will be observed in order. Once the block of non-coherent commands can be observed in order, the processing of coherent commands can continue.

Acquiring early ownership of a window of cache lines has advantages that extend beyond streaming write data to multiple targets. Making the NIU the single point of serialization allows the NIU to correctly preserve write ordering for transactions that are sent from a strongly ordered interface onto a weakly ordered interface.

Figure 5:
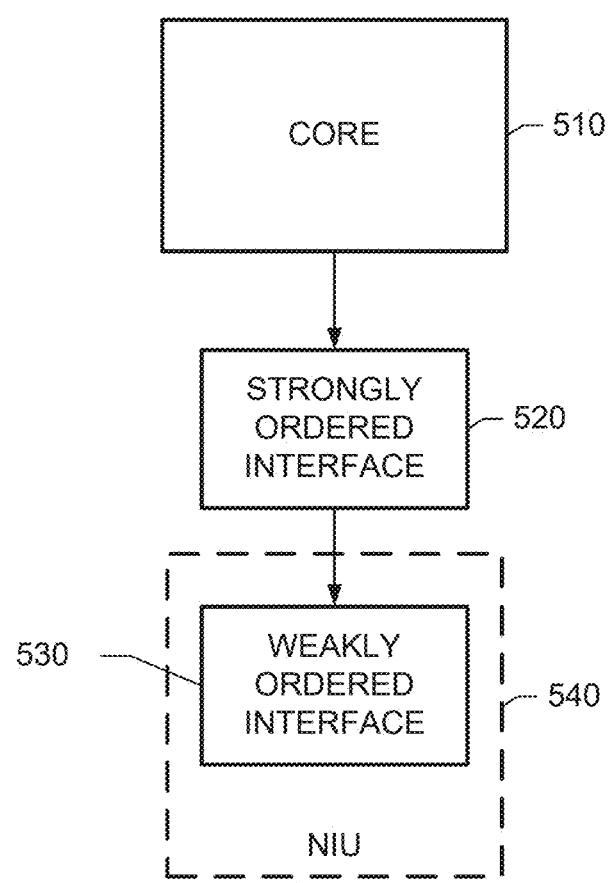
FIG. 5 shows a system including a core that writes onto a strongly ordered interface, which, in turn, writes onto a weakly ordered interface of a network interface unit in accordance with various aspects and embodiments herein.

Reference is now made to FIG. 5. A core 510 such as a CPU writes on a strongly ordered interface 520, such as a PCIe controller. The strongly ordered interface 520 then writes onto a weakly ordered interface (e.g., an AMBA controller) 530 of an NIU 540. Normally, this would create a problem, as each interface 520 and 530 would perform similar functions to ensure the correct ordering. The NIU 540 can be configured to support or not support ordered write observation. If it is not supported, the weakly-ordered interface 530 would wait for a response before sending the next write. If the NIU 540 supports it naively, the NIU 540 can accept all the writes and then send them out one by one. If the NIU 540 supports ordered write observation fully as described herein, the writes can start to be executed in parallel and out of order.

In some embodiments, the electronic system 100 may be a system-on-chip (SoC) that includes the NoC 140. However, an electronic system herein is not limited to a NoC.

Figure 6:
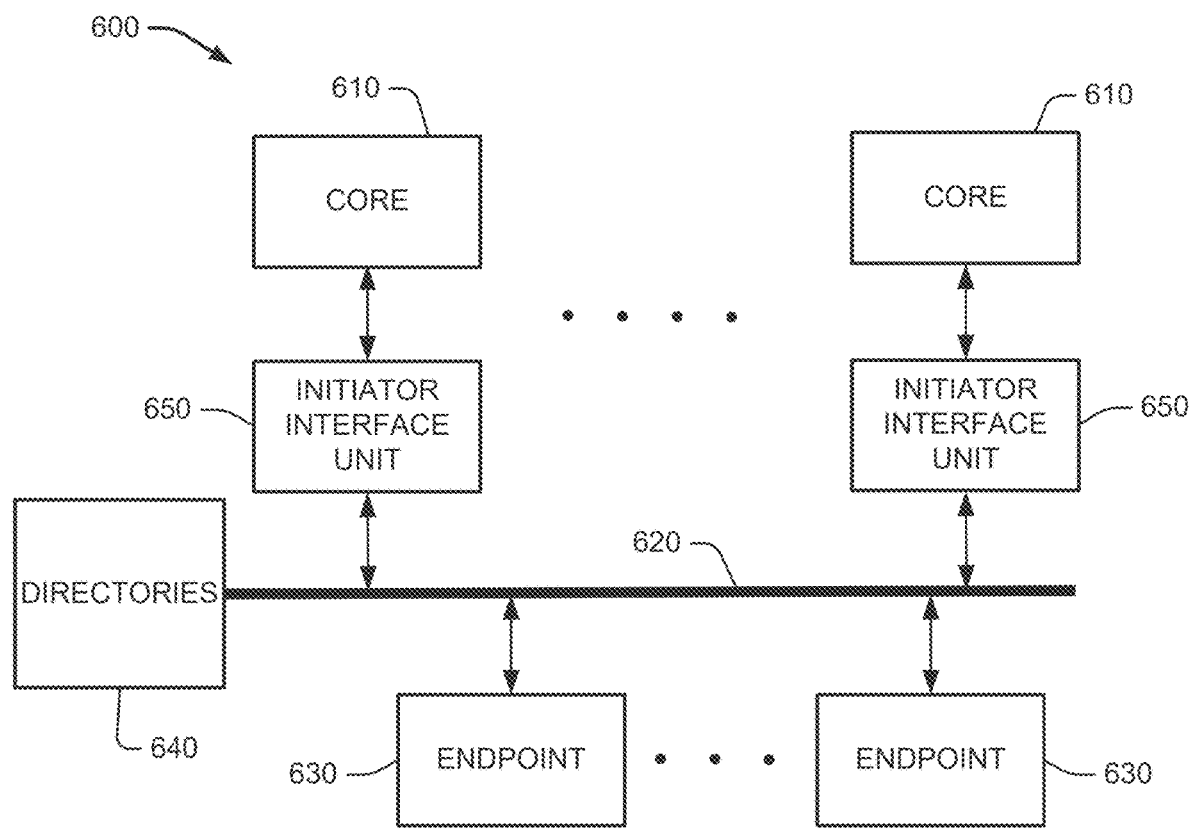
FIG. 6 shows a multicore-electronic system in accordance with various aspects and embodiments herein.

Reference to FIG. 6. An electronic system 600 includes multiple cores 610, an interconnect 620, and one or more endpoints 630 connected to the interconnect 620. The interconnect 620 may include a data bus.

The electronic system 600 further includes multiple directories 640 and a plurality of initiator interface units 650. The directories 640 and initiator interface units 650 maintain cache coherence as described herein. Each initiator interface unit 650 is configured to communicate with the directories 640 to acquire early ownership of windows of cache lines upon receipt of a request transaction, record the order of the writes in the request transaction, and stream write data to the cache lines in at least two multiple targets in parallel while keeping ordered write observation.

In some embodiments of the electronic system 600, the initiator interface units 650 may include ethernet cards, and the cores 610 may include racks of computers. The directory 640 may be a programmed microprocessor or it may be a specialized chip that oversees the transportation of large amounts of data.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Various examples are methods that use the behavior of either or a combination of machines. Method examples are complete wherever in the world most constituent steps occur. For example, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. In a multi-core electronic system, a directory-based method of processing a request transaction including writes to multiple targets, the method comprising:
    communicating, upon receipt of the request transaction, with a plurality of directories to acquire ownership of cache lines for the writes to establish a single point of serialization; and
    streaming write data to owned cache lines in at least two of the multiple targets in parallel while keeping ordered write observation,
    wherein the writes to the at least two of the multiple targets may be processed out of order but they are observed in order.

2. The method of claim 1, wherein keeping the ordered write observation includes observing the cache lines in order and terminating ownership of the cache lines in the same order, whereby a write becomes observable after ownership of its cache line is terminated.

3. The method of claim 2, wherein a linked list is used to maintain the order in which the writes are received.

4. The method of claim 1, wherein the writes in the request transaction are received in order, ordering is strict, and the writes are committed in the order received; whereby the writes are committed in order and observable in order but may be processed out-of-order.

5. The method of claim 1, wherein the directories do not communicate with each other, and the targets do not communicate with each other.

6. The method of claim 1, wherein a write is committed when its corresponding cache line is owned and the write is oldest.

7. The method of claim 1, wherein ownership is requested by a cache maintenance operation, and the writes are write-backs.

8. The method of claim 1, wherein the communicating and the streaming are performed by a network interface unit of a Network-on-Chip.

9. The method of claim 1, wherein the request transaction includes multiple writes that are ordered via a strongly ordered interface and received by a weakly ordered interface.

10. The method of claim 1, wherein the writes in the request transaction are addressed to coherent and non-coherent regions of the targets.

11. A multi-core electronic system comprising:
    a plurality of initiators;
    an interconnect including a corresponding plurality of initiator interfaces for the initiators and multiple directories for maintaining cache coherence; and
    a plurality of targets for communicating with the plurality of initiators via the interconnect;
    wherein each initiator interface is configured to:
        receive request transactions from its corresponding initiator;
        communicate with at least one of the directories to acquire ownership of cache lines upon receipt of a request transaction having writes to multiple targets;
        observe order of the cache lines; and
        stream write data to owned cache lines in at least two of the multiple targets in parallel, and terminate ownership of the cache lines as ordered.

12. The system of claim 11, wherein the writes to the at least two of the multiple targets are processed out of order but are observable in order as a result of the cache lines being terminated in order.

13. The system of claim 11, wherein an initiator interface that acquires the ownership of cache lines becomes a single point of serialization.

14. The system of claim 11, wherein the directories, the initiator interfaces, and the interconnect are elements of a network-on-chip.

15. The system of claim 11, wherein a write is committed when its corresponding cache line is owned and the write is oldest.

16. The system of claim 11, wherein ownership is acquired via a cache maintenance operation, and the writes are write-backs.

17. A network-on-chip (NoC) for a multi-core electronic system, the NoC comprising:
    a transport interconnect;
    a plurality of initiator network interface units (NIUs) and target NIUs for communicating over the transport interconnect via a packet-based protocol; and
    multiple directories for maintaining cache coherence,
    wherein each initiator NIU is configured to:
        receive request transactions;
        buffer write data;
        communicate with at least one of the directories over the interconnect transport to acquire ownership of cache lines upon receipt of a request transaction having the writes to multiple endpoints;
        observe order of the cache lines; and
        stream buffered write data to owned cache lines via at least two of the target NIUs, and terminate ownership of the cache lines as ordered.

18. The NoC of claim 17, wherein each NIU is further configured with a transaction table that uses a data structure to maintain the order of the cache lines.

19. The NoC of claim 17, wherein each initiator NIU that acquires ownership of cache lines becomes a single point of serialization.

20. The NoC of claim 17, wherein ownership is acquired via a cache maintenance operation, and the writes are write-backs.

* * * * *